US008607558B2

(12) United States Patent
Kawaguchi et al.

(10) Patent No.: US 8,607,558 B2
(45) Date of Patent: Dec. 17, 2013

(54) WORK MACHINE

(75) Inventors: Tadashi Kawaguchi, Hiratsuka (JP); Jun Morinaga, Yokohama (JP); Hiroaki Inoue, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 1033 days.

(21) Appl. No.: 12/450,473

(22) PCT Filed: Mar. 28, 2008

(86) PCT No.: PCT/JP2008/056153
§ 371 (c)(1),
(2), (4) Date: Sep. 28, 2009

(87) PCT Pub. No.: WO2008/123439
PCT Pub. Date: Oct. 16, 2008

(65) Prior Publication Data
US 2010/0064677 A1 Mar. 18, 2010

(30) Foreign Application Priority Data
Mar. 29, 2007 (JP) ................................. 2007-088382

(51) Int. Cl.
*E02F 9/20* (2006.01)
(52) U.S. Cl.
USPC ............................................. 60/431; 60/442
(58) Field of Classification Search
USPC ............ 60/713, 431, 432, 442; 318/140, 727, 318/798, 799
See application file for complete search history.

(56) References Cited

U.S. PATENT DOCUMENTS

| 3,800,759 | A | * | 4/1974 | Cedar | 123/339.11 |
| 4,454,843 | A | | 6/1984 | Uchida et al. | |
| 2006/0179830 | A1 | * | 8/2006 | Kamon et al. | 60/431 |
| 2007/0214782 | A1 | * | 9/2007 | Komiyama et al. | 60/431 |

FOREIGN PATENT DOCUMENTS

| GB | 2 424 964 | | 10/2006 |
| JP | 58-18535 | | 2/1983 |
| JP | 5-38402 | U | 5/1993 |
| JP | 2000-097065 | A | 4/2000 |
| JP | 2000-120461 | A | 4/2000 |
| JP | 2001-263123 | A | 9/2001 |

(Continued)

OTHER PUBLICATIONS

International Search Report dated Jul. 1, 2008 issued in PCT/JP2008/056153.

(Continued)

*Primary Examiner* — Edward Look
*Assistant Examiner* — Logan Kraft
(74) *Attorney, Agent, or Firm* — Edwards Wildman Palmer LLP

(57) ABSTRACT

A work machine includes: hydraulic actuators 21, 22, 23, 31, and 32; a capacitor 61 for storing electric power when a generator motor 44 operates as a generator and for supplying electric power when the generator motor 44 operates as a motor; and a swing electric motor 10, the hydraulic actuators 21, 22, 23, 31, and 32 and the swing electric motor 10 are operated by operation of operating levers 50, 70. The work machine includes an idling stop control unit 110 for stopping the idling of an engine 40 and retains the swing electric motor 10 in an operation prohibited state at least on the condition that stored voltage of the capacitor 61 is predetermined voltage or higher when the neutral states of the operating levers 50, 70 continue for a predetermined stop time during operation of the engine 40.

12 Claims, 8 Drawing Sheets

(56) References Cited

FOREIGN PATENT DOCUMENTS

| | | | |
|---|---|---|---|
| JP | 2002-013425 | | 1/2002 |
| JP | 2002-029289 A | | 1/2002 |
| JP | 2002-322926 | | 11/2002 |
| JP | 2002322926 A | * | 11/2002 |
| JP | 2003-065097 A | | 3/2003 |
| JP | 2003-307142 A | | 10/2003 |
| JP | 2003307142 A | * | 10/2003 |
| JP | 2004-263573 A | | 9/2004 |
| JP | 2005-307491 A | | 11/2005 |
| JP | 2006-193905 | | 7/2006 |
| JP | 2006193905 A | * | 7/2006 |
| WO | WO-2005/054649 | | 6/2005 |
| WO | WO 2005054649 A1 | * | 6/2005 |

OTHER PUBLICATIONS

Written Opinion dated Jul. 1, 2008 issued in PCT/JP2008/056153.

* cited by examiner

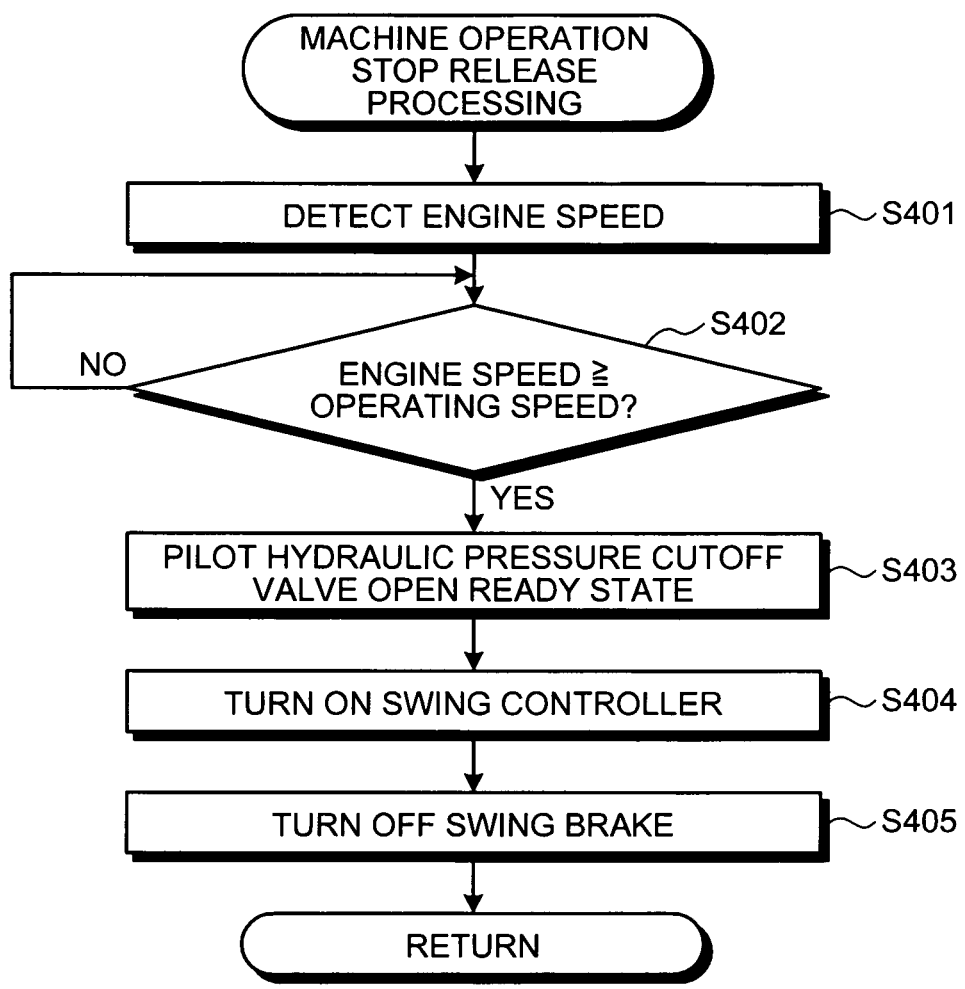

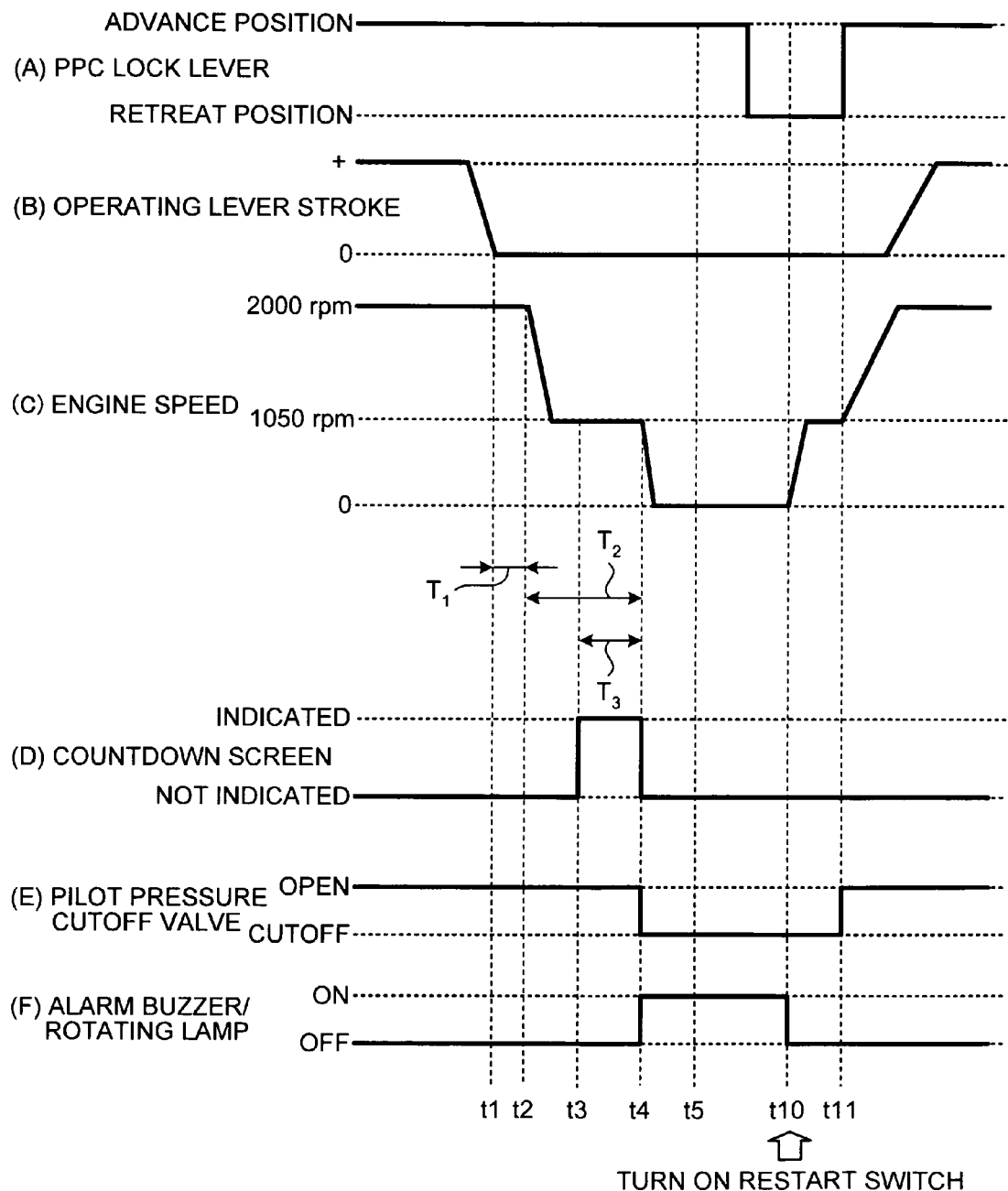

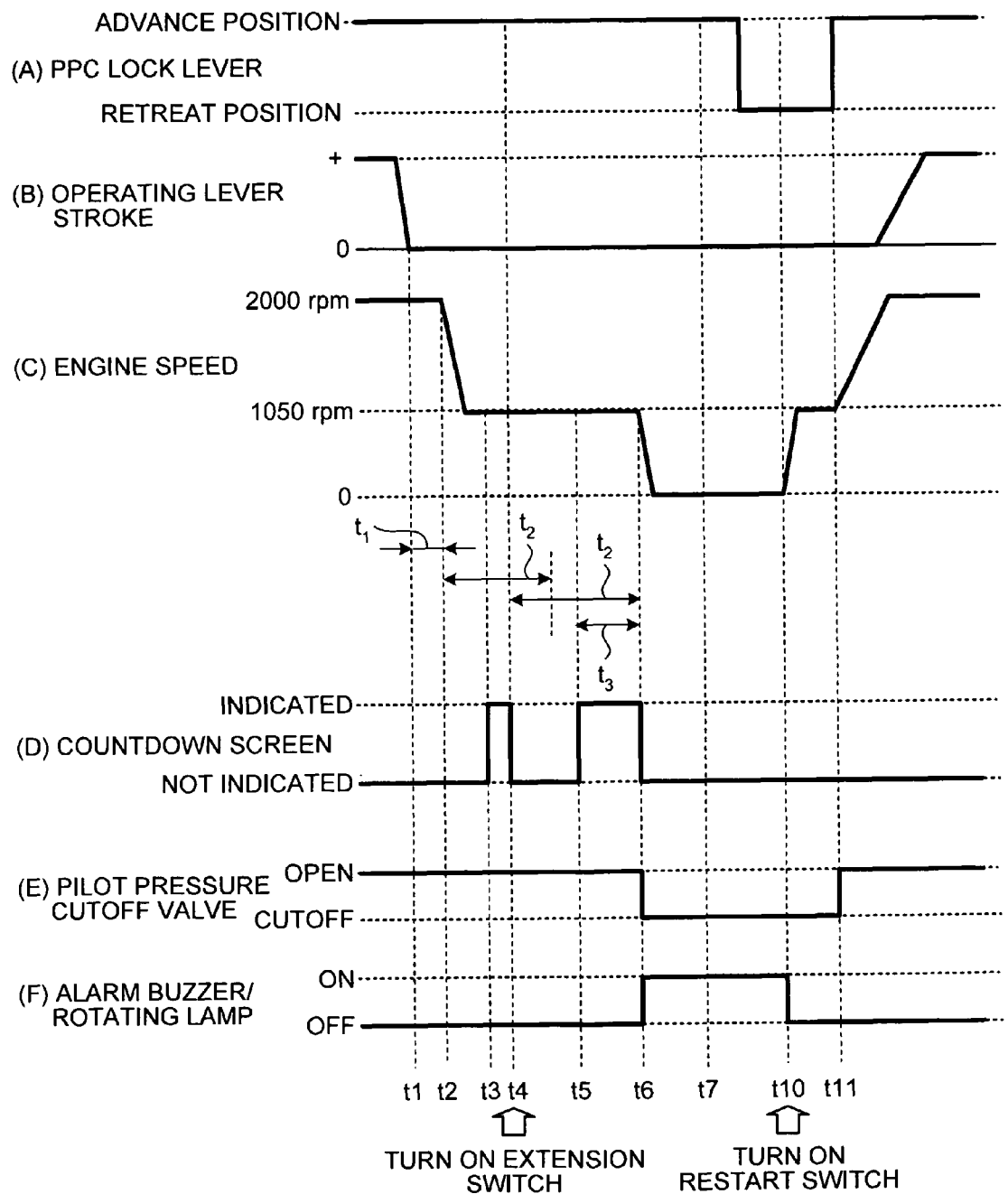

ly related to the description of the following in the application.

WORK MACHINE

TECHNICAL FIELD

The present invention relates to a work machine in which a hydraulic actuator and an electric actuator are caused to carry out desired operations by operation of operating levers.

BACKGROUND ART

Among conventional work machines in which an engine drives a hydraulic pump and pressure oil discharged from the hydraulic pump operates a hydraulic actuator for a work machine, there are machines in which unnecessary idling of the engine is stopped. For example, Patent Document 1 discloses stop of idling of the engine after a state without an operator in a cab has continued for a predetermined time. With these work machines, it is possible to reduce a fuel consumption and an amount of carbon dioxide to be emitted.
Patent Document 1: Japanese Patent Application Laid-Open No. 2002-13425

DISCLOSURE OF THE INVENTION

Problem to be Solved by the Invention

In recent years, an increasing number of hybrid work machines are made and there are work machines having an electric actuator as well as the above-described hydraulic actuator. If the work machine includes only the hydraulic actuator, discharge of pressure oil from a hydraulic pump is stopped when idling of the engine is stopped and therefore there is no fear of accidental operation of the hydraulic actuator even if an operating lever is operated erroneously in an idling stopped state. However, in the idling stopped state, an electric supply system cannot be shut down in case of restart of the engine. Therefore, in the hybrid work machine, the electric actuator is able to operate even in the idling stopped state.

With the above circumstances in view, it is an object of the present invention to provide a work machine that can stop idling to reduce a fuel consumption and an amount of carbon dioxide to be emitted without suffering from the problem caused by possession of an electric actuator.

Means for Solving the Problem

According to an aspect of the present invention, a work machine includes: a hydraulic pump driven by an engine; a hydraulic actuator driven by pressure oil discharged from the hydraulic pump; a generator motor interfacing with an output system of the engine; a power storage unit for storing electric power when the generator motor is caused to operate as a generator by the engine and for supplying electric power when the generator motor operates as a motor; and an electric actuator driven by the electric power supplied from the generator motor or the power storage unit. The hydraulic actuator and the electric actuator are operated according to operation of an operating lever, and the work machine includes an idling stop control unit has: an operating lever monitoring unit for monitoring an operated state of the operating lever during operation of the engine; a neutral state timing unit for measuring a time for which the operating lever is in a neutral state; an idling stop unit for stopping idling of the engine when the neutral state of the operating lever continues for a predetermined stop time; and a machine operation prohibiting unit for retaining the electric actuator in an operation prohibited state when the idling stop unit stops the idling of the engine. In the present application, the idling refers to operation of the engine when the work machine is not operating or operation of the engine without a load.

Advantageously, in the work machine, the idling stop control unit has a machine operation prohibiting unit to stop control by a power supply control unit or to control the power supply control unit in a stopped state so as to bring the electric actuator into a stopped state, and to operate a lock unit for mechanically preventing swing of an upper swing body with respect to a lower running body when the idling of the engine is stopped.

Advantageously, the work machine further includes a power supply control unit which is activated to control the supply of the electric power to the electric actuator according to a control signal when the control signal according to the operation of the operating lever is applied to the power supply control unit. The electric actuator has at least a swing electric motor being configured to swing an upper swing body with respect to a lower running body, and the idling stop control unit has a machine operation prohibiting unit to stop control by the power supply control unit or to control the power supply control unit in a stopped state so as to bring the electric actuator into a stopped state, and to operate a lock unit for mechanically preventing swing of the upper swing body with respect to the lower running body when the idling of the engine is stopped.

Advantageously, the work machine further includes a hydraulic pressure supply control unit to control supply of pressure oil from the hydraulic pump to the hydraulic actuator according to a pilot hydraulic pressure, when the pilot hydraulic pressure according to operation of the operating lever is supplied to the hydraulic pressure supply control unit. The idling stop control unit has a machine operation prohibiting unit to stop control by the power supply control unit or to control the power supply control unit in a stopped state so as to bring the electric actuator into a stopped state, and to cause a lock unit to mechanically prevent swing of the upper swing body with respect to the lower running body when the idling of the engine is stopped, and the machine operation prohibiting unit cuts off a supply system of the pilot hydraulic pressure to the hydraulic pressure supply control unit when the idling of the engine is stopped.

Advantageously, in the work machine, the idling stop control unit stops the idling of the engine and retains the electric actuator in the operation prohibited state on a condition that a predetermined idling stop prohibiting condition is not satisfied when the neutral state of the operating lever continues for the predetermined stop time.

Advantageously, in the work machine, the idling stop control unit determines that the idling stop prohibiting condition is satisfied at least when a stored voltage of the power storage unit is lower than a preset threshold value.

Advantageously, the work machine further includes a manually-operated operation extending unit. The idling stop control unit has a function of extending the stop time when the operation extending unit is turned on during continuation of the neutral state of the operating lever.

Advantageously, the work machine further includes a vehicle-mounted monitor for providing an indication and the manually-operated operation extending unit. The idling stop control unit has a countdown indicating processing unit for indicating countdown of time until the stop time is elapsed on the vehicle-mounted monitor, and the idling stop control unit has a function of extending the stop time when the operation extending unit is turned on during indication of the countdown on the vehicle-mounted monitor by the countdown indicating processing unit.

Advantageously, in the work machine, the idling stop control unit includes an idling stop processing unit that performs the processing for extending the stop time every time the operation extending unit is turned on.

Advantageously, in the work machine, the operation extending unit is a switch having an independent push button unit at an upper portion of the operating lever and outputting an operation signal to the idling stop processing unit when the push button unit is pushed.

Effects of the Invention

According to the invention, because the electric actuator is retained in the operation prohibited state when the idling of the engine is stopped, there is no fear that the electric actuator operates accidentally, even if the operating lever is operated erroneously. When the engine is running, the electric actuator is energized, which consumes much electricity. By preventing this, it is possible to reduce a fuel consumption and carbon dioxide to be emitted while preventing reduction in voltage of the power storage means and securing ease of restart of the engine.

According to the invention, the engine speed is reduced to the low speed before stop of the idling while the idling can be extended by the will of an operator. Therefore, it is possible to reduce the fuel consumption and the carbon dioxide to be emitted while minimizing reduction in work performance.

BRIEF DESCRIPTION OF THE DRAWINGS

FIG. 6 is a flow chart showing machine operation stop release processing shown in FIG. 4.

FIG. 7 is a timing chart showing an operated position of a PPC lock lever, an operated stroke of the operating lever, an engine speed, indication of countdown, a state of a pilot hydraulic pressure cutoff valve, and operating states of a rotating lamp and an alarm buzzer in the work machine shown in FIG. 1.

FIG. 8 is a timing chart showing the operated position of the PPC lock lever, the operated stroke of the operating lever, the engine speed, the indication of countdown, the state of the pilot hydraulic pressure cutoff valve, and the operating states of the rotating lamp and the alarm buzzer in the work machine shown in FIG. 1 when an extension switch is turned on.

Figure 1:
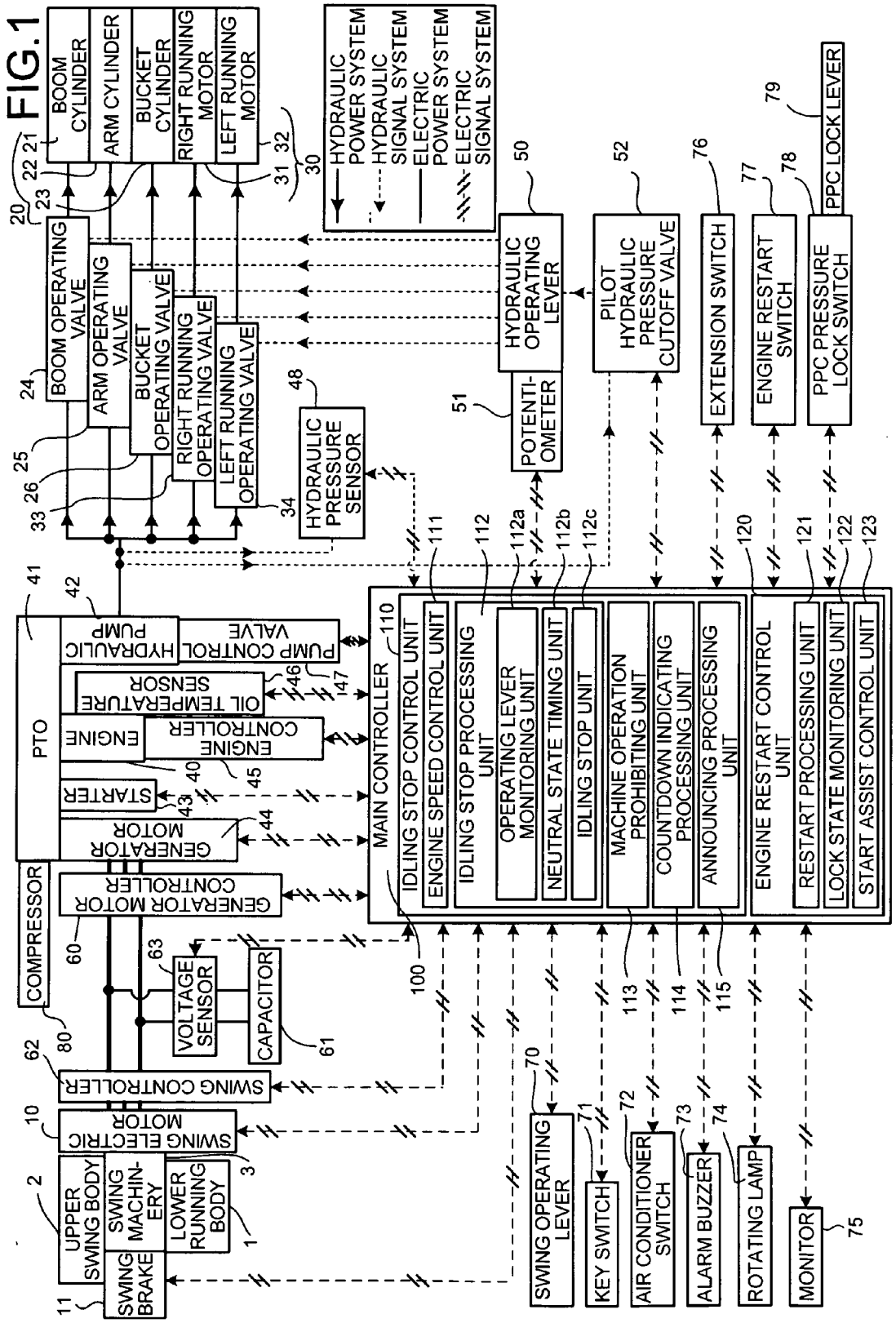
FIG. 1 is a drawing showing a structural example of a work machine that is an embodiment of the present invention.

EXPLANATIONS OF LETTERS OF NUMERALS 1 lower running body
2 upper swing body
3 swing machinery
10 swing electric motor
11 swing brake
20 working machine unit
21, 22, 23, 31, 32 hydraulic actuator
24, 25, 26, 33, 34 operating valve
30 running unit
40 engine
42 hydraulic pump
43 starter
44 generator motor
45 engine controller
50, 70 operating lever
52 pilot hydraulic pressure cutoff valve
60 generator motor controller
61 capacitor
62 swing controller
63 voltage sensor
70 swing operating lever
73 alarm buzzer
74 rotating lamp
75 monitor
76 extension switch
77 engine restart switch
78 PPC pressure lock switch
79 PPC lock lever
100 main controller
110 idling stop control means
111 engine speed control unit
112 idling stop processing unit
113 machine operation prohibiting unit
114 countdown indicating processing unit
115 announcing processing unit
120 engine restart control means
121 restart processing unit
122 lock state monitoring unit
123 start assist control unit

BEST MODE(S) FOR CARRYING OUT THE INVENTION

With reference to the accompanying drawings, a preferred embodiment of a work machine according to the present invention will be described below in detail.

Embodiment

FIG. 1 shows the work machine that is the embodiment of the present invention. The work machine shown here as an example is for carrying out construction work like a hydraulic shovel and includes a lower running body 1 and an upper swing body 2. The lower running body 1 travels by using left and right crawler tracks (not shown). The upper swing body 2 can be swung with respect to the lower running body 1 by a swing machinery 3 formed between the upper swing body 2 and the lower running body 1. Although it is not clearly shown in the drawings, the swing machinery 3 includes a swing circle and a pinion engaged with the swing circle, for example. By driving the pinion with a swing electric motor 10 that is an electric actuator, the swing machinery 3 can swing the upper swing body 2 with respect to the lower running body 1. Also, when a swing brake (lock means) 11 is actuated, it is possible to mechanically prevent swing of the upper swing body 2 with respect to the lower running body 1.

The work machine is provided with an working machine unit 20 on the upper swing body 2 and a running unit 30 on the lower running body 1. The working machine unit 20 is for carrying out construction work such as excavation and loading. Applied to the work machine in the embodiment is the working machine unit 20 having an arm at a tip end portion of a boom and a bucket at a tip end portion of the arm. The working machine unit 20 includes a boom cylinder 21, an arm cylinder 22, and a bucket cylinder 23. By properly supplying pressure oil to the working machine hydraulic actuators 21, 22, 23, it is possible to cause the boom, the arm, and the bucket to operate.

The running unit 30 is for individually driving the crawler tracks of the lower running body 1. The running unit 30 in the embodiment includes a right running motor 31 and a left running motor 32. By properly supplying pressure oil to the running hydraulic actuators 31, 32, it is possible to drive the crawler tracks.

Moreover, the working machine includes an engine 40 as a prime mover, a hydraulic pump 42, a starter 43, and a generator motor 44 connected to an output shaft of the engine 40 via a PTO (Power Take Off) 41.

The engine 40 is a diesel engine output of which is controlled by adjusting a fuel injection amount to be supplied into cylinders. The fuel injection amount can be adjusted by giving a control signal to an engine controller 45 attached to the engine 40 from a main controller 100 described later. The engine 40 includes an oil temperature sensor 46. The oil temperature sensor 46 detects temperature of lubricating oil circulating in the engine 40 and outputs a detection result to the main controller 100 described later.

The hydraulic pump 42 is a variable displacement type driven by the engine 40. A capacity of the hydraulic pump 42 can be changed by giving a control signal to a pump control valve 47 from the main controller 100 described later. The hydraulic pump 42 can supply pressure oil to the above-described boom cylinder 21, arm cylinder 22, bucket cylinder 23, right running motor 31, and left running motor 32 during operation of the engine 40.

On respective supply passages for the pressure oil from the hydraulic pump 42 to the hydraulic actuators 21, 22, 23, 31, and 32, a pressure sensor 48 and operating valves (hydraulic pressure supply control means) 24, 25, 26, 33, and 34 are provided. The pressure sensor 48 detects pressure of the pressure oil flowing through the supply passages and outputs a detection result to the main controller 100 described later.

The operating valves 24, 25, 26, 33, and 34 are a boom operating valve 24, an arm operating valve 25, a bucket operating valve 26, a right running operating valve 33, and a left running operating valve 34 provided for the boom cylinder 21, the arm cylinder 22, the bucket cylinder 23, the right running motor 31, and the left running motor 32, respectively, and control supply of pressure oil from the hydraulic pump 42 to the respective hydraulic actuators 21, 22, 23, 31, and 32 based on pilot hydraulic pressure supplied according to operation of a hydraulic operating lever 50.

The hydraulic operating lever 50 is an input device disposed in such a position in a cab seat on the upper swing body 2 as to be operated by an operator. The hydraulic operating lever 50 is disposed on pilot oil paths from the hydraulic pump 42 to the respective hydraulic actuators 21, 22, 23, 31, 32, gives pilot hydraulic pressure according to an operated direction and an operated amount to each of the operating valves 24, 25, 26, 33, and 34, and can output an operation signal according to the operated direction and the operated amount to the main controller 100 described later via a potentiometer 51 attached to the hydraulic operating lever 50. The hydraulic operating lever 50 does not necessarily output the operation signal via the potentiometer 51. For example, if a hydraulic operating lever to which a hydraulic pressure sensor instead of the potentiometer is attached is employed, the operating lever can output the operation signal via the hydraulic pressure sensor and it is possible to monitor an operated state of the hydraulic operating lever based on the operation signal.

On the pilot oil path from the hydraulic pump 42 to the hydraulic operating lever 50, a pilot hydraulic pressure cutoff valve 52 is provided. The pilot hydraulic pressure cutoff valve 52 operates in response to a control signal from the main controller 100 described later and cuts off/allows supply of the pressure oil from the hydraulic pump 42 to the hydraulic operating lever 50. When the pilot hydraulic pressure cutoff valve 52 is in a cutoff state, supply of the pressure oil from the hydraulic pump 42 to the hydraulic operating lever 50 is cut off and operations of the operating valves 24, 25, 26, 33, and 34 are stopped whether or not the hydraulic operating lever 50 is operated.

The starter 43 is an electric motor that is driven to rotate when the main controller 100 described later gives a drive signal to the starter 43.

The generator motor 44 is switched between generator and motor operations according to control by a generator motor controller 60. The generator motor controller 60 switches operation of the generator motor 44 according to a control signal from the main controller 100 described later. When the generator motor 44 operates as a generator, the generator motor controller 60 stores electric power generated by the generator motor 44 in a capacitor (power storage means) 61 or supplies the electric power to the above-described swing electric motor 10 via a swing controller (electric power supply control means) 62. On the other hand, when the generator motor 44 operates as a motor, the electric power stored in the capacitor 61 is supplied to the generator motor 44. The capacitor 61 is made up of a capacitor or a storage battery and includes a voltage sensor 63. The voltage sensor 63 detects the stored voltage of the capacitor 61 and outputs a detection result to the main controller 100 described later.

The swing controller 62 carries out control of supply of the electric power to the swing electric motor 10 according to a control signal when the main controller 100 described later gives the control signal to the swing controller 62.

The work machine is also provided with a swing operating lever 70, a key switch 71, an air conditioner switch 72, an alarm buzzer 73, a rotating lamp 74, a monitor 75, an extension switch (operation extending means) 76, an engine restart switch 77, and a PPC pressure lock switch 78.

The swing operating lever 70 is an input device for inputting a swing command for the upper swing body 2 and is disposed in such a position in the cab seat on the upper swing body 2 as to be operated by the operator similarly to the hydraulic operating lever 50. An operation signal representing an operated direction and an operated amount of the swing operating lever 70 is given to the main controller 100 described later.

The key switch 71 is a so-called momentary-type switch means and disposed in such a position in the cab seat as to be operated by the operator. If the key switch 71 is operated to an ON position with an engine key inserted, an ON signal is output from the key switch 71 to the main controller 100 described later and supply of the electric power from the capacitor 61 becomes possible. If the engine key is operated from the ON position for starting, a starting command for the engine 40 is output to the main controller 100 described later while the engine key is being operated for starting. As a result, a drive signal is given from the main controller 100 described later to the starter 43, for example, to start the engine 40. If the force for operating the engine key for starting is released, the key switch 71 returns to the ON position, but the operating state of the engine 40 continues, because the ON signal continues to be output to the main controller 100 described later. If the engine key is turned off, the supply of the electric power from the capacitor 61 will be cu off and fuel supply to the engine 40 is also cut off. Then the engine 40 stops and therefore whole work machine also stops.

The air conditioner switch 72 is for giving an operation signal for turning an air conditioner compressor 80 connected to the PTO 41 of the engine 40 on/off to the main controller 100. Each of the alarm buzzer 73 and the rotating lamp 74 sounds or lights up in response to a drive signal from the main controller 100 to thereby make an announcement to the outside of the work machine. The alarm buzzer 73 is mounted in such a position that people around the work machine can hear the sound. The rotating lamp 74 is provided in such a position on an upper portion of a cabin of the upper swing body 2, for example, that people around the work machine can easily recognize light of the rotating lamp 74 visually. The monitor 75 is a vehicle-mounted display means provided in such a position in the cab seat that the operator can visually recognize the monitor 75 and provides various indications according to control signals including output data given from the main controller 100 described later.

Figure 2:
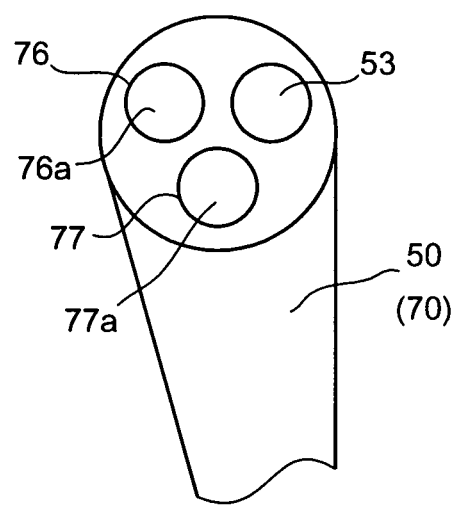
FIG. 2 is a conceptual diagram showing an upper end portion of an operating lever applied to the work machine shown in FIG. 1.

The extension switch 76 is operated to extend the idling of the engine 40. The engine restart switch 77 is operated to restart the engine 40. The extension switch 76 and the engine restart switch 77 respectively have separate push buttons 76a, 77a provided on an upper end portion of the hydraulic operating lever 50 or the swing operating lever 70 as shown in FIG. 2. When the push buttons 76a, 77a are pushed, the switches 76, 77 output their respective operation signals to the main controller 100 described later. A reference numeral 53 in the drawing is a horn switch for sounding a horn.

The PPC pressure lock switch 78 outputs a control signal for cutting off/opening the pilot hydraulic pressure cutoff valve 52 shown in FIG. 1 and can be operated by the operator through a PPC lock lever 79 provided in the cab seat. To put it concretely, when the PPC lock lever 79 is caused to retreat so that the operator can come into and out of the cab seat (hereafter referred to as a "retreat position" of the PPC lock lever 79), the pilot hydraulic pressure cutoff valve 52 is brought into the cutoff state. On the other hand, when the PPC lock lever 79 is advanced so that the operator cannot come into and out of the cab seat (hereafter referred to as an "advance position" of the PPC lock lever 79), the pilot hydraulic pressure cutoff valve 52 is opened. The output signal from the PPC pressure lock switch 78 is given to the main controller 100 described later.

Moreover, the work machine includes the main controller 100. The main controller 100 has a function of carrying out a centralized control of the work machine to conduct the construction work by driving the engine 40, the hydraulic pump 42, the starter 43, the generator motor 44, the swing electric motor 10, the swing brake 11, the working machine unit 20, and the running unit 30 based on the signals output from the above-described various sensors 46, 48, and 63, various switches 71, 72, 76, 77, and 78, and operating levers 50, 70.

For example, if the operating lever 50 is operated during operation of the engine 40, pilot hydraulic pressure is applied to the operating valve 24, 25, 26, 33, or 34 according to operation of the hydraulic operating lever 50 and the operating valve 24, 25, 26, 33, or 34 controls pressure oil supplied from the hydraulic pump 42 to thereby cause the working machine unit 20 and the running unit 30 to carry out desired operations. Meanwhile, the main controller 100 commands the engine controller 45 an engine target speed and the engine controller 45 controls the fuel injection amount to achieve the target speed in response to the command.

The main controller 100 is provided with an idling stop control means 110 and an engine restart control means 120. The idling stop control means 110 stops idling of the engine 40 when predetermined stop conditions are satisfied during operation of the engine 40. The engine restart control means 120 allows restart of the engine 40 when predetermined restart conditions are satisfied in a state where the idling of the engine 40 is stopped by the idling stop control means 110.

The idling stop control means 110 includes an engine speed control unit 111, an idling stop processing unit 112, a machine operation prohibiting unit 113, a countdown indicating processing unit 114, and an announcing processing unit 115.

The engine speed control unit 111 monitors the operated states of the hydraulic operating lever 50 and the swing operating lever 70 (hereafter both of them are merely referred to as the "operating levers 50, 70") in an idling state (e.g., about 2000 rpm) of the engine 40 and outputs a control signal to the engine controller 45 so as to reduce the speed of the engine 40 to a predetermined low speed (e.g., about 1050 rpm) when a duration for which the operating levers 50, 70 are retained in neutral states reaches a preset low speed time (T1 seconds).

The idling stop processing unit 112 has an operating lever monitoring unit 112a, a neutral state timing unit 112b, and an idling stop unit 112c. The operating lever monitoring unit 112a monitors the operated states of the operating levers 50, 70 during operation of the engine 40. The neutral state timing unit 112b measures a time for which the operating levers 50, 70 are retained in the neutral states. The idling stop unit 112c stops idling of the engine 40 when a result of timing by the neutral state timing unit 112b reaches a preset stop time (T2 seconds) if no preset stop prohibiting conditions are satisfied.

In the embodiment, the following stop prohibiting conditions are set.

(1) The PPC lock lever 79 is in the retreat position.
(2) Stored voltage of the capacitor 61 is smaller than a preset threshold value.
(3) The air conditioner is in operation.
(4) The engine is in warm-up operation.
(5) An operation time after restart of the engine is shorter than a preset time.

The reason why the PPC lock lever 79 is in the retreat position is the stop prohibiting condition is because the operator is highly likely to get away from the cab seat for a long time and turning the engine key off to stop operation of the whole work machine is preferable to stopping the idling.

The reason why the stored voltage of the capacitor 61 is smaller than the preset threshold value is the stop prohibiting condition is because to maintain ease of restart of the engine 40 after the stop of the idling. As described later, at the time of restart of the engine, starter 43 and assisting operation by the generator motor 44 require electric power and therefore it is preferable to set the above-described threshold value at a relatively high value.

The reason why the air conditioner is in operation and the reason why the engine is in warm-up operation are the stop prohibiting conditions are because their goals cannot be achieved when the idling is stopped.

The reason why the operation time after restart of the engine is shorter than the preset time is the stop prohibiting condition is because work performance may be impaired and the fuel consumption may increase if the engine 40 is started and stopped frequently.

The idling stop processing unit 112 has a function of extending the stop time if the extension switch 76 is turned on when the engine 40 is caused to be running at a low speed by the engine speed control unit 111. If the extension switch 76 is operated repeatedly, the idling stop processing unit 112 performs processing for extending the stop time every time the switch 76 is turned on.

The machine operation prohibiting unit 113 stops the control signal from the main controller 100 to the swing controller 62 and actuates the swing brake 11 to mechanically prevent swing of the upper swing body 2 with respect to the lower running body 1 when the idling of the engine 40 is stopped by the idling stop processing unit 112. Furthermore, the machine operation prohibiting unit 113 outputs a control signal for retaining the cutoff state to the pilot hydraulic pressure cutoff valve 52 when the idling of the engine 40 is stopped by the idling stop processing unit 112. When the pilot hydraulic pressure cutoff valve 52 is maintained in the cutoff state by the control signal from the machine operation prohibiting unit 113, the pilot hydraulic pressure cutoff valve 52 stays in the cutoff state even if the PPC lock lever 79 is operated.

The countdown indicating processing unit 114 outputs indication data for providing a countdown indication to the monitor 75 when a time to the stop of the idling by the idling stop processing unit 112 becomes a predetermined time (T3 seconds) or shorter. For example, the countdown indicating processing unit 114 outputs the indication data to the monitor 75 when the time to the stop of the idling becomes 10 seconds and provides the countdown indication such as "10 seconds to the idling stop", "9 seconds to the idling stop" until the idling is stopped. When the time to the stop of the idling is extended to 10 seconds or longer by the above-described extension switch 76, the countdown indication is stopped temporarily and processing for restarting the countdown indication is carried out when the time becomes 10 seconds again.

When the idling of the engine 40 is stopped by the idling stop processing unit 112, the announcing processing unit 115 sounds the alarm buzzer 73 and lights up the rotating lamp 74 to thereby make an announcement of the idling stopped state to the outside of the work machine.

Moreover, the announcing processing unit 115 outputs announcement data to the monitor 75 to make an announcement when the following conditions are satisfied.

(1) The PPC lock lever 79 has been moved to the advance position.

(2) A predetermined time has elapsed after the stop of the idling.

(3) Stored voltage of the capacitor 61 is smaller than a preset threshold value.

The indication is provided on the monitor 75 when these conditions are satisfied in order to prevent the work machine from being left with the engine key inserted in the idling stopped state.

On the other hand, the engine restart control means 120 includes a restart processing unit 121, a lock state monitoring unit 122, and a start assist control unit 123.

If the engine restart switch 77 is turned on in the state in which the idling of the engine 40 is stopped by the idling stop control means 110, the restart processing unit 121 outputs restart permission for the engine 40 to the starter 43 and the engine controller 45 on condition that the operating levers 50, 70 are retained in the neutral states. When the engine 40 restarts, the restart processing unit 121 first causes the engine 40 to run at a first speed (e.g., about 1050 rpm) at maximum. Then, when the PPC lock lever 79 is moved to the advance position to bring the pilot hydraulic pressure cutoff valve 52 into the open state, the restart processing unit 121 revs up the engine 40 to a second speed (e.g., about 2000 rpm).

The lock state monitoring unit 122 outputs a control signal for retaining the pilot hydraulic pressure cutoff valve 52 in the cutoff state until a predetermined operation possible state condition is satisfied after the engine 40 is restarted by the restart processing unit 121. If the pilot hydraulic pressure cutoff valve 52 is retained in the cutoff state by the control signal from the lock state monitoring unit 122, the pilot hydraulic pressure cutoff valve 52 does not operate and stays in the cutoff state even if the PPC lock lever 79 is operated. In the embodiment, the processing is carried out considering the operation possible state condition to be satisfied when the speed of the restarted engine 40 has increased to a preset operating speed (e.g., about 700 rpm).

When the starter 43 is driven in response to the restart permission from the restart processing unit 121 and the engine 40 is restarted, the start assist control unit 123 outputs, to the generator motor controller 60, a control signal for causing the generator motor 44 to operate as the motor until the speed of the engine 40 reaches a predetermined assist end speed.

Figure 3:
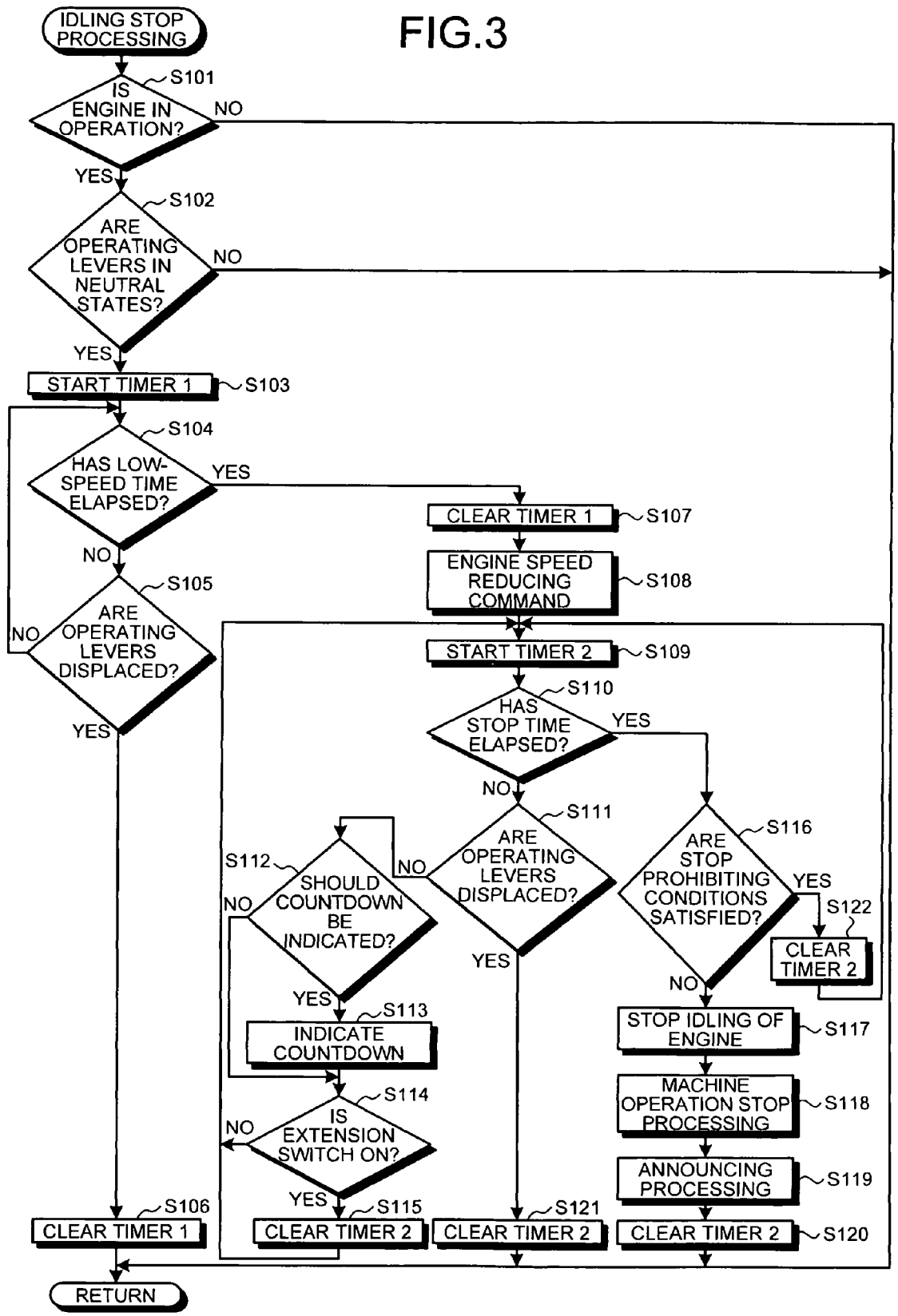
FIG. 3 is a flow chart showing idling stop processing performed by a main controller shown in FIG. 1.

FIG. 3 is a flow chart showing the idling stop processing performed by the above-described idling stop control means 110 of the main controller 100. The idling stop processing of the work machine will be described below with reference to FIG. 3 and timing charts in FIGS. 7, 8 as necessary. As shown in FIGS. 7, 8, the following description is based on the assumptions that the PPC lock lever 79 is in the advance position and that the pilot hydraulic pressure cutoff valve 52 is open.

First, if the engine 40 is in operation (step S101: Yes), the main controller 100 monitors the operated states of the operating levers 50, 70 (step S102). If the operating levers 50, 70 are retained in the neutral states (step S102: Yes), whether or not the duration of the neutral states reaches the low-speed time (T1 seconds) (step S103, step S104, step S105). If the operating levers 50, 70 are displaced before the duration reaches the low-speed time (step S104: No→step S105: Yes), the main controller 100 resets a timer 1 (step S106) and then returns the procedure to end this idling stop processing. As a result, the engine 40 continues idling at a speed of about 2000 rpm.

On the other hand, if the neutral states of the operating levers 50, 70 continue for the low-speed time (step S104: Yes, t1→t2 in FIGS. 7 and 8), the timer 1 is cleared (step S107), and then a control signal is output to the engine controller 45 so as to reduce the engine speed to the low speed (step S108). As a result, the idling of the engine 40 continues at the low speed to which the engine speed has been reduced. In this way, the fuel consumption and the amount of carbon dioxide to be emitted can be reduced as compared with a case where the idling of the engine 40 is continued in the previous state (t2→in FIGS. 7 and 8).

Furthermore, the main controller 100 outputs a control signal to the engine controller 45 and newly starts a timer 2 simultaneously (step S109) and determines whether or not the neutral states of the operating levers 50, 70 continue for the stop time (T2 seconds) (step S110, step S111).

Meanwhile, the main controller 100 determines whether or not it is time to indicate the countdown (step S112). If it is time to indicate (step S112: Yes, t3 in FIGS. 7 and 8, t5 in FIG. 8), the countdown is indicated on the monitor 75 (step S113, t3→t4 in FIGS. 7 and 8, t5→t6 in FIG. 8).

The main controller 100 monitors whether or not the extension switch 76 is turned on (step S114). If the extension switch 76 is turned on (step S114: Yes, t4 in FIG. 8), the timer 2 is cleared (step S115) and the procedure moves on to step S109 (t4→t6 in FIG. 8).

If the neutral states of the operating levers 50, 70 continue for the stop time when the idling of the engine 40 is at the low speed (step S110: Yes, t4 in FIG. 7, t6 in FIG. 8), the main controller 100 performs stop processing of the engine 40 on condition that no stop prohibiting conditions are satisfied (step S116: No→step S117).

The main controller 100 that has performed the stop processing of the engine 40 performs machine operation stop processing (step S118), performs announcing processing (step S119), and ends this idling stop processing after clearing the timer 2 (step S120).

As a result, unnecessary idling of the engine 40 is stopped and therefore it is possible to reduce the fuel consumption and the amount of carbon dioxide to be emitted. In this case, because the idling of the engine 40 is stopped at least on condition that the stored voltage of the capacitor 61 is equal to or greater than the preset threshold value, it is possible to secure sufficient electric power to restart the engine 40.

Moreover, when the idling of the engine 40 is stopped, the control signal to the swing controller 62 is stopped and the swing brake 11 is actuated to mechanically prevent swing of the upper swing body 2 with respect to the lower running body 1. Furthermore, the control signal for retaining the cutoff state is output to the pilot hydraulic pressure cutoff valve 52. Therefore, even if the operating levers 50, 70 are operated erroneously in the idling stopped state, there is no fear of accidental operation of the swing electric motor 10 and the hydraulic actuators 21, 22, 23, 31, and 32, the upper swing body 2 does not swing with respect to the lower running body 1, the lower running body 1 does not travel, and the working machine unit 20 does not operate.

In the idling stopped state of the engine 40, the rotating lamp 74 stays lit up and the alarm buzzer 73 is sounding. Therefore, it is possible to announce that the idling stopped state to the people outside the work machine.

Even if the idling of the engine 40 is at the low speed, the procedure is returned (step S121) after the timer 2 is cleared and this idling stop processing ends without stopping the idling, if the operating levers 50, 70 are operated at the will of the operator who has visually recognized the countdown indication (step S111: Yes). Therefore, it is possible to continue the construction work without stopping the idling and there is no fear that the above-described idling stop processing seriously interferes with the construction work. Even if the idling of the engine 40 is at the low speed, the procedure is returned (step S121) after the timer 2 is cleared and this idling stop processing ends without stopping the idling, if any of the above-described stop prohibiting conditions, i.e., (1) the PPC lock lever 79 is in the retreat position, (2) the stored voltage of the capacitor 61 is smaller than the preset threshold value, (3) the air conditioner is in operation, (4) the engine is in warm-up operation, and (5) an operation time after restart of the engine is shorter than the preset time, is satisfied (step S116: Yes). Therefore, (1) if the operator gets away from the cab seat for a long time, the idling is not stopped automatically in order to encourage the operator to turn the key switch 71 off to stop the engine. (2) The idling is not stopped automatically under circumstances where it might become difficult to restart the engine. (3) The processing does not interfere with the operation of the air conditioner. (4) The processing does not interfere with the warm-up operation of the engine. (5) It is possible to prevent the frequent occurrence of automatic stop and automatic restart of the engine.

Figure 4:
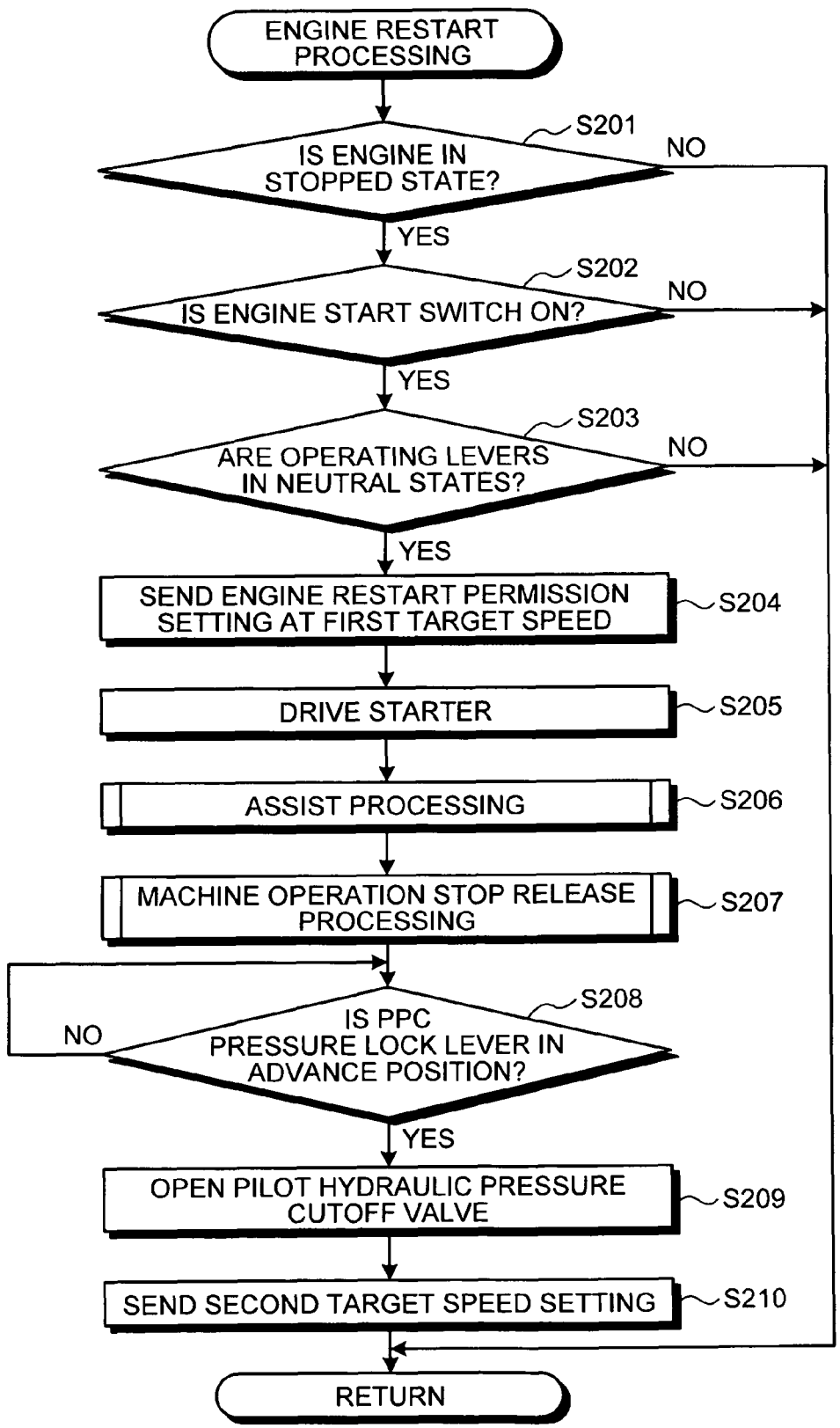
FIG. 4 is a flow chart showing an engine restart processing performed by the main controller shown in FIG. 1.

FIG. 4 is a flow chart showing engine restart processing performed by the engine restart control means 120 of the above-described main controller 100. The idling stop processing of the work machine will be described below with reference to FIG. 4 and the timing charts in FIGS. 7 and 8 if necessary. The following description is based on the assumptions that the engine 40 is in the idling stopped state by the above-described idling stop processing, that the PPC lock lever 79 is in the advance position, and that the pilot hydraulic pressure cutoff valve 52 is in the cutoff state as shown at t5 in FIG. 7 or t7 in FIG. 8.

If the engine 40 is in the idling stopped state by the idling stop processing (step S201: Yes), the main controller 100 first monitors the operated states of the engine restart switch 77 and the operating levers 50, 70 (step S202, step S203). If the engine restart switch 77 has been turned on and the operating levers 50, 70 are in the neutral states (step S202: Yes→step S203: Yes, t10 in FIGS. 7 and 8), the main controller 100 outputs restart permission of the engine 40 to the starter 43 and the engine controller 45 (step S204). The restart permission of the engine 40 outputted to the starter 43 and the engine controller 45 comes with an upper limit, i.e., the first speed. As a result, the starter 43 is driven (step S205) and the engine 40 is restarted at the first speed as a target speed. Simultaneously with restart of the engine 40, the rotating lamp 74 is turned off and sounding of the alarm buzzer 73 is stopped to end the announcement to the surroundings.

Figure 5:
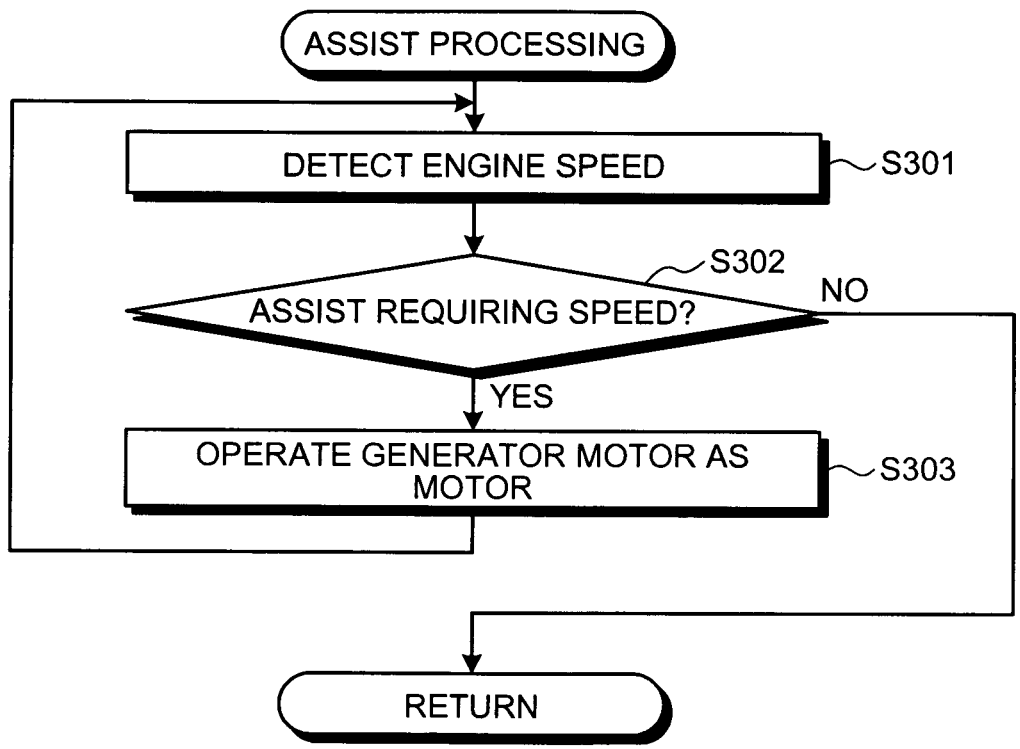
FIG. 5 is a flow chart showing assist processing shown in FIG. 4.

If the starter 43 is driven, the main controller 100 simultaneously performs assist processing (step S206). In the assist processing, the main controller 100 detects the engine speed (step S301), determines whether or not the detected engine speed is an assist requiring speed (step 302), and causes the generator motor 44 to operate as the motor when it is the assist requiring speed (step S302: Yes) as shown in FIG. 5.

The assist requiring speed about which determination is made in step S302 is a speed of the engine 40 which is 50 rpm or higher and an absolute value of a difference of which from a target engine speed is 100 rpm or greater. If the generator motor 44 operates as the motor at the assist requiring speed, the engine 40 is driven at torque of the starter 43 plus torque of the generator motor 44 and it is possible to swiftly and reliably rev up the engine 40 to the target speed with a reduced load on the starter 43.

If the absolute value of the difference between the engine speed and the target engine speed becomes smaller than 100 rpm (step S302: No), the main controller 100 returns the processing and ends this assist processing.

In FIG. 4, the main controller 100 which has ended the assist processing then performs machine operation stop release processing (step S207). In the machine operation stop release processing, the main controller 100 first detects the engine speed (step S401) and determines whether or not the detected engine speed is equal to or greater than the operating speed (step S402), as shown in FIG. 6. If the engine speed is equal to or greater than the operating speed (step S402: Yes), the main controller 100 allows the pilot hydraulic pressure cutoff valve 52, which has been retained in the cutoff state, to open (step S403), resumes output of the control signal to the swing controller 62 (step S404), and releases the actuated swing brake 11 to return the procedure (step S405).

As a result, as shown in FIG. 4, if the PPC lock lever 79 is moved to the advance position (step S208: Yes), the pilot hydraulic pressure cutoff valve 52 comes into the open state (step S209). In this way, the pilot pressure is applied to the operating valves 24, 25, 26, 33, and 34 when the hydraulic operating lever 50 is operated, which means that the working machine unit 20 and the running unit 30 are able again to be operated according operation of the hydraulic operating lever 50. If the swing operating lever 70 is operated, the control signal according to operation of the swing operating lever 70 is output to the swing controller 62 to swing the upper swing body 2 with respect to the lower running body 1.

In step S209 in FIG. 4, the main controller 100 that has opened the pilot hydraulic pressure cutoff valve 52 outputs a control signal for increasing the speed of the engine 40 to a second speed to the engine controller 45 simultaneously with the opening of the valve 52 (step S210). As a result, the speed of the engine 40 becomes about 2000 rpm and the work machine returns to the state before the idling stop processing.

Because restart of the engine 40 is permitted on condition that the operating levers 50, 70 are in the neutral states in the above-described restart processing of the engine 40, there is no fear that a load for driving the hydraulic pump 42 is applied to the engine 40 during the restart. Therefore, it is possible to reliably restart the engine 40, even if the idling of the engine 40 is stopped in order to reduce the fuel consumption and the amount of carbon dioxide to be emitted.

Then, the above-described idling stop processing and engine restart processing are repeatedly performed and it is possible to reduce the fuel consumption and the amount of carbon dioxide to be emitted without interfering with the construction work.

Although the speed of the engine speed is reduced at the beginning of stopping of the idling in the above-described embodiment, reduction of the engine speed is not indispensable.

Although the extension switch 76 and the engine restart switch 77 are provided as separate switches independent of each other in the above-described embodiment, they are not necessarily provided as the separate switches and the same switch may be shared. In this case, the main controller 100 extends the stop time when the switch is turned on during low-speed operation of the engine 40 by the engine speed control unit 111. On the other hand, when the engine is in the stopped state and the switch is turned on, the main controller 100 outputs restart permission of the engine 40 to the starter 43 and the engine controller 45 on condition that the operating levers 50, 70 are retained in the neutral states.

INDUSTRIAL APPLICABILITY

As described above, the invention is useful to the work machine, in which the hydraulic actuator and the electric actuator are caused to carry out desired operations by operation of the operating levers, and is suitable for reducing the fuel consumption and the amount of carbon dioxide to be emitted by stopping the idling without suffering the problem caused by possession of the electric actuator.

The invention claimed is:

1. A work machine comprising:
a hydraulic pump driven by an engine;
a hydraulic actuator driven by pressure oil discharged from the hydraulic pump;
a generator motor interfacing with an output system of the engine;
a power storage unit for storing electric power when the generator motor is caused to operate as a generator by the engine and for supplying electric power when the generator motor operates as a motor; and
an electric actuator driven by the electric power supplied from the generator motor or the power storage unit, wherein the hydraulic actuator and the electric actuator are operated according to operation of an operating lever, and
the work machine includes an idling stop control unit having:
an operating lever monitoring unit for monitoring an operated state of the operating lever during operation of the engine;
a neutral state timing unit for measuring a time for which the operating lever is in a neutral state;
an idling stop unit for stopping idling of the engine when the neutral state of the operating lever continues for a predetermined stop time; and
a machine operation prohibiting unit for retaining the electric actuator in an operation prohibited state when the idling stop unit stops the idling of the engine.

2. The work machine according to claim 1, wherein the idling stop control unit has a machine operation prohibiting parts to stop control by a power supply control unit or to control the power supply control unit in a stopped state so as to bring the electric actuator into a stopped state, and to operate a lock unit for mechanically preventing swing of an upper swing body with respect to a lower running body when the idling of the engine is stopped.

3. The work machine according to claim 1 further comprising
a power supply control unit which is activated to control the supply of the electric power to the electric actuator according to a control signal when the control signal according to the operation of the operating lever is applied to the power supply control unit, wherein
the electric actuator has at least a swing electric motor being configured to swing an upper swing body with respect to a lower running body, and
the idling stop control unit has a machine operation prohibiting unit to stop control by the power supply control unit or to control the power supply control unit in a stopped state so as to bring the electric actuator into a stopped state, and to operate a lock unit for mechanically preventing swing of the upper swing body with respect to the lower running body when the idling of the engine is stopped.

4. The work machine according to claim 1 further comprising
a hydraulic pressure supply control unit to control supply of pressure oil from the hydraulic pump to the hydraulic actuator according to a pilot hydraulic pressure, when the pilot hydraulic pressure according to operation of the operating lever is supplied to the hydraulic pressure supply control unit, wherein
the idling stop control unit has a machine operation prohibiting unit to stop control by the power supply control unit or to control the power supply control unit in a stopped state so as to bring the electric actuator into a stopped state, and to cause a lock unit to mechanically prevent swing of the upper swing body with respect to the lower running body when the idling of the engine is stopped and
the machine operation prohibiting unit cuts off a supply system of the pilot hydraulic pressure to the hydraulic pressure supply control unit when the idling of the engine is stopped.

5. The work machine according to claim 1, wherein the idling stop control unit stops the idling of the engine and retains the electric actuator in the operation prohibited state on a condition that a predetermined idling stop prohibiting condition is not satisfied when the neutral state of the operating lever continues for the predetermined stop time.

6. The work machine according to claim 5, wherein the idling stop control unit determines that the idling stop prohibiting condition is satisfied at least when a stored voltage of the power storage unit is lower than a preset threshold value.

7. The work machine according to claim 1 further comprising
- a manually-operated operation extending unit, wherein the idling stop control unit has a function of extending the stop time when the operation extending unit is turned on during continuation of the neutral state of the operating lever.

8. The work machine according to claim 7 further comprising
- a vehicle-mounted monitor for providing an indication and the manually-operated operation extending unit, wherein
- the idling stop control unit has a countdown indicating processing unit for indicating countdown of time until the stop time is elapsed on the vehicle-mounted monitor, and
- the idling stop control unit has a function of extending the stop time when the operation extending unit is turned on during indication of the countdown on the vehicle-mounted monitor by the countdown indicating processing unit.

9. The work machine according to claim 7, wherein
- the idling stop control unit includes an idling stop processing unit that performs the processing for extending the stop time every time the operation extending unit is turned on.

10. The work machine according to claim 9, wherein
- the operation extending unit is a switch having an independent push button unit at an upper portion of the operating lever and outputting an operation signal to the idling stop processing unit when the push button unit is pushed.

11. The work machine according to claim 1, wherein
- the machine operation prohibiting unit cuts off a supply system of a pilot hydraulic pressure to the hydraulic pressure supply control unit controlling supply of pressure oil from the hydraulic pump to the hydraulic actuator when the idling of the engine is stopped.

12. The work machine according to claim 1, wherein
- the idling stop control unit reduces an engine speed before idling stop.

* * * * *